United States Patent [19]

Knowles

[11] 3,867,111
[45] Feb. 18, 1975

[54] VAPOR RECOVERY SYSTEM
[75] Inventor: William T. Knowles, Houston, Tex.
[73] Assignee: Shell Oil Company, Houston, Tex.
[22] Filed: Aug. 29, 1973
[21] Appl. No.: 392,578

[52] U.S. Cl............................. 55/21, 55/58, 55/88, 55/163
[51] Int. Cl............................................ B01d 53/04
[58] Field of Search............. 55/21, 58, 74, 88, 387, 55/179, 163

[56] References Cited
UNITED STATES PATENTS

| | | | |
|---|---|---|---|
| 3,085,379 | 4/1963 | Kiyonaga et al. | 55/58 |
| 3,243,938 | 4/1966 | Lavery et al. | 55/163 |
| 3,282,027 | 11/1966 | Johnson et al. | 55/163 |
| 3,543,484 | 12/1970 | Davis | 55/387 |
| 3,581,782 | 6/1971 | Onufer | 55/387 |

Primary Examiner—Charles N. Hart
Attorney, Agent, or Firm—Ronald R. Reper; John M. Duncan

[57] ABSTRACT

A system is disclosed for preventing gasoline vapors contained in air vented from gasoline storage tanks from entering the atmosphere, which includes a conduit to pass gasoline vapor-laden air to a bed of adsorbent for gasoline; and when the adsorbent approaches saturation, subjecting it to a subatmospheric pressure, with or without heat, to an extent and for a time adequate to remove gasoline from the adsorbent and restore it to a regenerated condition, after which the gasoline removed from the adsorbent is returned to approximately atmospheric pressure and passed into a body of liquid gasoline in a storage vessel for liquid gasoline wherein it is absorbed.

5 Claims, 1 Drawing Figure

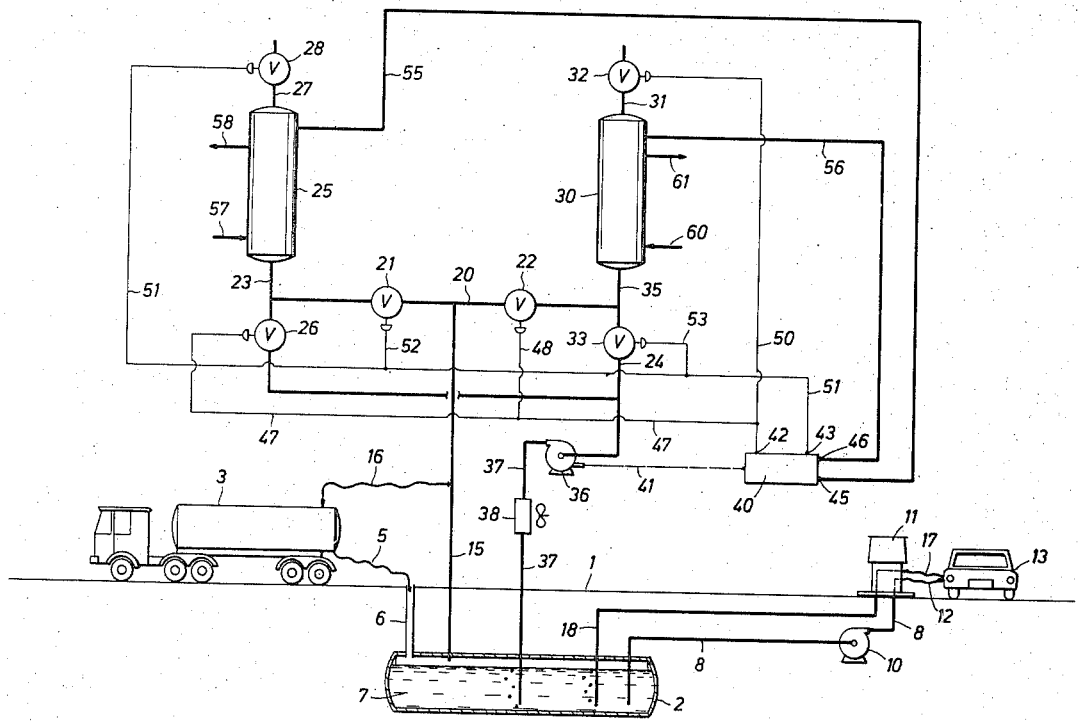

PATENTED FEB 18 1975

3,867,111

VAPOR RECOVERY SYSTEM

BACKGROUND OF THE INVENTION

A source of air pollution is the gasoline vapor in air vented from storage tanks for gasoline when those tanks are filled. Storage tanks, such as the underground storage tanks in filling stations and the fuel tanks in automobiles, draw air in as the volume of the liquid is gradually depleted. Long contact with the liquid causes the air in the tank to become saturated with gasoline vapors. When liquid is added to the tank to replenish the supply, a volume of gasoline-saturated air essentially equal to the volume of liquid added is displaced and vented to the atmosphere unless some means for removing the gasoline vapor from the air is employed.

THE INVENTION

The present invention provides an effective and inexpensive system to avoid gasoline vapor loss to the atmosphere when storage tanks for gasoline are filled. This invention is a system for recovering vapors for reuse, which includes a bed of solid adsorbent that is capable of adsorbing gasoline vapors from a mixture of gasoline vapors with air. The vapor-laden air passes through the bed before being vented to the atmosphere. As a consequence, air vented to the atmosphere via the adsorbent bed is substantially free of gasoline vapor thereby avoiding atmospheric pollution and at the same time saving valuable gasoline.

The invention also includes means for producing a vacuum within the adsorbent bed to desorb gasoline from the adsorbent when the capacity of the bed for adsorbing gasoline vapors is approached. In accordance with the invention, the desorbed vapors are returned to atmospheric or slightly higher pressure, passed beneath the surface of a stored volume of gasoline and are absorbed in the gasoline.

Within the broad scope of this invention, there are many preferred embodiments and operating procedures. One preferred embodiment is to employ a system wherein vapor volumes are exchanged between various vessels so that only excesses need by passed through the adsorbent bed, whereby the capacity of the adsorbent bed and of the accompanying system can be greatly diminished; or, alternatively, the time between regenerations may be greatly extended. For example, when a filling station storage tank is to be filled from the tank of a delivery truck, the volume of liquid added to the storage tank is substantially the same as the volume of liquid removed from the truck. Consequently, the amount of vapor-laden air vented from the storage tank will be substantially the same as the volume of air vented into the tank of the delivery truck. In a preferred embodiment of this invention, during loading of a storage tank the vapor spaces of the tank on the truck and the storage tank will be connected, and both will be connected either directly or indirectly to the adsorbent bed. In such a system only the small difference in vapor volume caused by small temperature or pressure differences between the two vapor spaces will be passed through the adsorbent bed thereby greatly diminishing the volume of gasoline-laden air that must be treated by the adsorbent bed.

A slightly modified version of the same technique may be used to exchange vapor volumes between a filling station storage tank and the fuel tank of a vehicle. In such a system the vapor volume exchange will be effected by connecting the vapor space of the vehicle fuel tank and the vapor space of the storage tank during the period when the fuel is removed from the storage tank and added to the vehicle tank. Again, a substantially equal volume of vapor is exchanged and only the slight volume difference, due to thermal expansion or small pressure variations, will pass through the adsorbent bed.

The above described volume exchange systems relate to an ideal system where the various vessels and conduits are completely enclosed, and such systems are referred to hereinafter as closed systems. When systems are used in which outside air enters the various flow streams, this invention is still effective although it may be necessary to accommodate to a greater volume of air. Systems in which small amounts of air are induced into the various flow streams, for example by the Venturi effect of a liquid stream passing through a nozzle where a completely tight connection is not made, may also be employed with this invention. Such systems are referred to hereinafter as tight systems. In tight systems equal or substantially equal volume exchanges of air between storage tanks will never be made because some volume of air will always be added to the vapor volumes being exchanged. In tight systems the adsorbent bed will always have to deal with a significant volume of gasoline vapor-laden air, and greater amounts of adsorbent or more frequent regeneration of the adsorbent will be necessary. Another adaptation of this invention to a tight system, in a preferred embodiment, is the interconnection of the vapor space of the vessel being filled to the vapor space of the vessel being emptied through a dip leg in the vessel being emptied. This expedient will cause all of the air entering the vapor space of the vessel being emptied to bubble through the stored liquid; and, accordingly, all of the air will be saturated with gasoline vapor as it enters the vapor space thereby reducing substantially the possibility of formation of explosive mixtures. Saturation of air with gasoline vapors may be accomplished by other techniques, such as spraying gasoline into the line carrying vapor-laden air between vessels.

The present invention is also useful in systems in which large amounts of air are forced into the various streams. These systems are hereinafter referred to as open systems. An example of an open system is one in which the gasoline vapor-laden air escaping from a fuel tank as it is being filled is prevented from escaping to the atmosphere by being forcibly induced into a collection system. For example, the nozzle for filling a vehicle fuel tank may be provided with a hood that has a partial vacuum induced by a blower in it so that all of the air vented from the fuel tank as well as a large volume of extraneous air will pass into the vapor recovery system thereby preventing gasoline vapors from entering the atmosphere. In such systems the air drawn into the system may constitute more than 90% of the gas phase to be dealt with; and, accordingly, substantially larger amounts of adsorbent will be needed. In an open system it is not reasonable to saturate the air via a dip leg because such large quantities of gasoline would be taken into the air that an extremely heavy load on the adsorbent would be created.

Whether the system for collecting vapors is open, tight or closed, or whether the system involves volume exchange or not, eventually the gasoline vapor-laden air to be vented passes through the bed of adsorbent wherein substantially all of the gasoline is removed from it, and air substantially free of gasoline is passed to the atmosphere. Before the adsorbent is saturated and before a significant amount of gasoline vapor breaks through the bed, the adsorbent must be regenerated. In accordance with this invention, regeneration is effected by sealing the adsorbent from the atmosphere and from all vapor spaces and by operating a vacuum pump to create and maintain a subatmospheric pressure within the adsorbent bed for a sufficient time to carry away enough of the gasoline contained therein to regenerate the adsorbent. The gasoline is vaporized as a result of the subatmospheric pressure. Pressures lower than 0.5 psia, and preferably lower than 0.1 psia, are employed; and such pressures may be attained easily with equipment that is readily available. The gasoline thus removed is returned to atmospheric or slightly superatmospheric pressure at a temperature at which it can be absorbed in volume of stored gasoline into which it is passed without significantly raising the temperature of the gasoline. Generally, the gasoline recovered from the adsorbent bed will be enriched in the lower boiling components of the total gasoline volume; but after a period of operation, the volume of lower boiling material restored to the general gasoline volume will approximate both in volume and character the gasoline lost from that general volume in saturating the air in the vapor space above the stored gasoline. Accordingly, operation of the system of this invention will have little or no effect on the vapor pressure or other characteristics of the stored gasoline.

It is within the scope of this invention to provide heat to the adsorbent bed to aid in regenerating the adsorbent. Heat may be in the form of electrical heating elements, steam or hot water coils, or other sources. Although some cooling of vapors withdrawn from the adsorbent bed is desirable to minimize the small temperature rise in the stored gasoline into which the vapors are absorbed, when the adsorbent bed is heated to aid in driving off gasoline vapors, cooling probably will be required. The cooling required will be minimal and may be effected with a simple air or water cooler. The cooler may be located to cool vapors on the suction side of the pump, but preferably it will cool the warmer fluid on the discharge side of the pump which will be vapor or mixed liquid and vapor phase. It may also be desirable to dry the gas removed from the adsorbent bed to avoid introduction of, or build up of, water in gasoline storage tanks.

The system of this invention must be operative at all times when liquid is being transferred from one storage tank to another if it is to avoid pollution of the atmosphere. If a filling station has regular periods when it is closed, a single bed of adsorbent, with sufficient capacity between regenerations to adsorb all vapors resulting from fuel delivered from one tank to another during the operating hours of the station, may be employed; and the bed of adsorbent can then be regenerated when the filling station is closed. If the filling station is open 24 hours a day, a system that includes two or more adsorbent beds must be employed so that one can be operating while the other is being regenerated. One particularly desirable arrangement is to provide a system employing two adsorbent beds, with each bed having enough capacity between successive regenerations to remove the gasoline from the vapor-laden air passed through the bed during loading of the filling station storage tank plus the amount of vapor-laden air passed through the adsorbent bed while filling automobile fuel tanks from the filling station storage tanks. In such a system the adsorbent beds can be switched from the adsorbent mode to the regeneration mode every time a tank truck refills a filling station storage tank, so that the capacity of a bed of adsorbent will never be exceeded.

The regeneration of an adsorbent bed usually will be accomplished very quickly compared to the time it spends adsorbing vapors. Regeneration can be terminated automatically, for example, by automatically stopping a vacuum pump when a suitable low pressure in the adsorbent bed is reached or by terminating the regeneration cycle after a predetermined time period has elapsed. By regulating the time of the adsorption cycle by such factors as the volume of gas treated and by regulating the time of the regeneration cycle by such factors as the ultimate pressure in the adsorbent bed or the time that the adsorbent is subjected to subatmospheric pressure, sophisticated instruments for sensing hydrocarbons in flowing streams may be avoided.

The accompanying drawing is a highly schematic representation of a system embodying this invention, and it is provided to show the various functions that will be employed without regard to scale. The line 1 in the drawing represents grade below which is buried a filling station storage tank 2. There is also illustrated a tank delivery truck 3 provided with a liquid delivery hose 5 for delivering liquid gasoline through a suitable conduit 6 to join the volume of gasoline 7 maintained in the tank 2. There is also illustrated a conduit 8 for delivering gasoline through a pump 10 and a filling station island 11 for delivery through a hose 12 to an automobile or other vehicle 13. The equipment thus far described is the conventional equipment that already exists in virtually every filling station or is periodically associated with every filling station.

In accordance with the present invention, the vapor space of the storage tank 2 is connected via pipe 15 and flexible hose 16 to the vapor space in the tank on delivery truck 3. Accordingly, when liquid is delivered from delivery truck 3 to storage tank 2, the vapor-laden air in the vapor space of vessel 2 passes through line 15 and is drawn into the tank of truck 3 via line 16 as the level of the liquid in the tank of truck 3 diminishes. Any excess vapor-laden air from the vapor space of tank 2 passes on through line 15 to the vapor recovery system to be described hereinafter. Lines 5, 15 and 16, as illustrated, constitute a closed system.

The hose 12 will terminate in a suitable nozzle, not part of this invention, which is capable of collecting the vapor-laden air expelled from the fuel tank of vehicle 13 as the level of gasoline in that tank rises during filling. The vapor-laden air is returned through flexible hose 17 from which it is conducted into conduit 18 which terminates below the surface of liquid in vessel 2 so that the air bubbling through the gasoline in tank 2 becomes saturated as it enters the vapor space above the liquid therein. If the volume of air entering tank 2 through line 18 exceeds the volume of gasoline removed from tank 2 via line 8, that excess air will pass through line 15 to the vapor recovery system to be described. The system including hose 17 and line 18 constitutes a tight system.

Vapors passing through line 15 enter line 20 which contains valve 21 and valve 22. One of valve 21 and valve 22 is open and the other is closed. For illustration, the vapor recovery system will be described with valve 21 open and valve 22 closed. When valve 21 is open, the excess vapors passing from line 15 will enter line 23 and will pass into vessel 25 beneath the adsorbent bed contained therein. The vapor-laden air passes through the bed of solid adsorbent maintained in vessel 25 and is vented from above the bed through line 27 and valve 28 which is open when valve 21 is open. Vapors could pass through the bed from top to bottom or from side to side. The solid adsorbent maintained in vessel 25 may be any of the solid adsorbents known to the art which are capable of adsorbing gasoline vapors from a mixture of gasoline vapors and air. Examples of suitable adsorbents are activated charcoal, silica gel, and certain forms of porous minerals such as alumina, magnesia, etc. which are known to selectively adsorb gasoline vapors from air.

As described thus far, almost all of the air vented from the storage tank 2 as a result of filling the storage tank 2 is exchanged for the same volume of gasoline removed from the tank truck 3. The air vented from the fuel tank of vehicle 13, as well as some induced air, is exchanged for the volume of liquid removed from storage tank 2 in filling the fuel tank of vehicle 13. Any excessive amount of vapor-laden air from either of the operations passes through line 15 and ultimately through vessel 25 wherein the gasoline is adsorbed from the vapor-laden air and relatively gasoline-free air is vented through line 27.

While the bed in vessel 25 is in the adsorption mode, the bed in vessel 30 is either in the regeneration mode or is regenerated and waiting until the bed in vessel 25 approaches its capacity to the extent that it needs regeneration. For purposes of illustration, the regeneration mode of the bed in vessel 30 will be described.

In the regeneration mode, valve 22 and valve 32 are closed to prevent vapor-laden air or atmospheric air from entering the bed to be regenerated. Valve 33 is opened so that conduit 35 may be connected to the suction side of a vacuum pump 36 via line 24. The vacuum pump creates a subatmospheric pressure within the vessel 30 causing gasoline adsorbed on the adsorbent contained therein to vaporize and to be removed through lines 35 and 24 and pump 36. Pump 36 discharges into line 37 which passes through a cooler 38 to remove heat from the vapors or mixed liquid-vapor phase which ultimately discharges through a dip leg below the surface of the liquid in storage tank 2 wherein the vapors are absorbed in the gasoline contained therein. When regeneration is initiated, the vacuum pump 36 will draw some air from the vessel 30 and that air will pass through the dip leg at the bottom of line 37, will bubble into the vapor space saturated with gasoline vapors, and will pass through line 15 and into vessel 25 so that the air may be vented and the gasoline contained therein removed by the adsorbent in vessel 25. However, as the regeneration proceeds, less and less air will be drawn from vessel 30 until ultimately substantially only gasoline will be discharged into vessel 2 by way of line 37. The adsorbent will normally operate over a limited range of its ultimate capacity because gasoline vapors will break through the bed before the adsorbent is completely saturated and regeneration to remove all gasoline, or even a substantial portion, is very difficult. Thus, the capacity of the adsorbent referred to herein is the capacity between regenerations rather than its total capacity.

The illustration also shows a suitable control system for use with the embodiment shown in the drawing. A central control 40, which contains conventional circuits for effecting the controls to be described hereinafter, is connected to operate the pump 36 through conductor 41. Connections 42 and 43 are provided to give impulses which either open valves or close valves, and these impulses may be electric, hydraulic, pneumatic or other. Each of connections 42 and 43 is capable of giving an open impulse or a close impulse so that all valves connected thereto will respond in the appropriate manner to that impulse. Connections 45 and 46 on control 40 receive impulses from vessels 25 and 30 respectively, indicating the pressure in those vessels. The pressure sensed in one or the other of vessel 25 or 30 may be employed to actuate or deactuate the pump 36. If the regeneration period is determined by the elapse of a suitable time period, the pressure sensing devices and the means for actuating the pump in response to them may be eliminated in favor of a timer.

Carrying on with the illustration wherein vessel 25 is in the adsorption mode while vessel 30 is in the regeneration mode, position 42 on controller 40 is providing a valve-close impulse and its connections to valve 26 through lead 47, to valve 22 through lead 48, and to valve 32 through lead 50 supply the valve-close impulses to those valves. When vessel 25 is in the adsorption mode and vessel 30 is in the regeneration mode, position 43 on controller 40 is providing a valve-open impulse; and its connections to valve 28 through lead 51, to valve 21 through lead 52, and to valve 33 through lead 53 supply the valve-open impulses to those valves.

During the portion of the cycle where vessel 25 is in the adsorption mode, the line 55 carries atmospheric pressure, and suitable switching means within the controller 40 prevent that pressure from actuating pump 36. Line 56 carries a subatmospheric pressure which, when it becomes low enough, will cause controller 40 to turn off the pump 36. The pressure at which pump 36 is turned off is selected to be one at which the bed of adsorbent in vessel 30 is regenerated.

When it is time for vessel 25 to be changed from the adsorption mode to the regeneration mode, because it has become saturated with gasoline or because a suitable time interval has elapsed or because another delivery is being made, either automatic or manual operation of the controller 40 will cause position 42 to send a valve-open impulse and position 43 to send a valve-close impulse. As a result of these impulses, valves 21 and 28 will close thereby isolating vessel 25 from the atmosphere and at the same time valve 26 will open. Simultaneously valve 22 and valve 32 will open so that vapors may flow through vessel 30 and at the same time valve 33 will close. The controller 40 will also connect line 55 through point 45 on the controller to be the condition-sensing line for the operation of pump 36. As a result of these changes, vapor-laden air in line 15 will pass through valve 22 and line 35 into the vessel 30 which contains regenerated adsorbent, and the vapor-free air resulting from passing through vessel 30 will be vented to the atmosphere through line 31. The pressure in line 55 will be sensed as atmospheric which in turn will actuate the pump 36 to produce a subatmospheric pressure via line 23 and valve 26 in the vessel 25. When a sufficient subatmospheric pressure has been produced to insure that the bed of adsorbent in vessel 25 is regenerated, the pump 36 will stop functioning and the bed of regenerated adsorbent in the vessel 25 will simply be maintained until the time for changing it to the adsorption mode arrives.

As mentioned heretofor, heat may be supplied to the adsorbent bed during the regeneration mode and for this purpose a source of heat entering vessel 25 through line 57 and discharging through line 58 may be employed during regeneration. The heat may be electric, hot water, steam or other convenient source. A heat source for the bed 30 may be provided through line 60 and removed through line 61. Heat will not be employed during the adsorption mode but only during the regeneration mode.

From the foregoing description, it is evident that the present invention provides a system for recovering gasoline vapors from vapor-laden air, which system completely avoids atmosphere pollution with gasoline vapors vented from storage tanks and additionally recovers the vapors and thereby conserves them for reuse so that the vapors neither pollute the atmosphere nor have their energy content wasted.

What is claimed is:

1. A system to recover gasoline from gasoline vapor-laden air that is vented while filling a first gasoline storage tank from the gasoline contained in a second gasoline storage tank, comprising:
   A. a conduit for delivering liquid from the second storage tank to the first storage tank,
   B. a conduit connecting the vapor space of the second storage tank to the vapor space of the first storage tank,
   C. at least one vessel containing a bed of solid adsorbent capable of selectively adsorbing gasoline from said vapor-laden air,
   D. a valved vent to the atmosphere positioned to vent said vessel,
   E. a valved inlet into said vessel on the other side of said bed from said vent, said inlet connected to said conduit connecting the vapor space of said second storage tank to the vapor space of said first storage tank,
   F. a valved conduit from said vessel connecting the inlet side of said bed to the suction side of a vacuum pump,
   G. a conduit for passing gasoline essentially at atmospheric pressure from the discharge side of said vacuum pump to a point below the surface of liquid in said first storage tank or said second storage tank,
   H. means are provided to simultaneously close the valve in said valved vent and the valve in said valved inlet, and to open the valve in said valved conduit, and to actuate said vacuum pump, and
   I. means are provided to stop said vacuum pump (1) when a predetermined subatmospheric pressure of about 0.5 psia or less is reached, or (2) after a predetermined time period has elapsed from the time said pump started.

2. The system of claim 1 wherein heating means are provided to heat said bed of solid adsorbent.

3. The system of claim 1 wherein cooling means are provided to cool gasoline vapors removed from said bed by said vacuum pump.

4. The system of claim 1 wherein means are provided to stop said vacuum pump after a predetermined time period has elapsed from the time said pump started.

5. A process for recovering gasoline vapor from vapor-laden air expelled from a tank while filling it with gasoline, comprising:
   A. collecting said vapors,
   B. passing at least some of said vapors via a valved inlet conduit through a bed of solid adsorbent capable of selectively adsorbing gasoline from the vapor-laden air,
   C. passing air substantially free of gasoline vapors from a valved vent on the other side of said bed of adsorbent to the atmosphere,
   D. stopping the flow of vapor-laden air through said bed before said adsorbent becomes saturated with gasoline,
   E. simultaneously closing the valve in said valved vent and the valve in said valved inlet and reducing the pressure within said had by means of a vacuum pump communicating with said bed via a valved conduit,
   F. subsequently maintaining a pressure lower than 0.5 psia within said bed to desorb gasoline from said bed to regenerate said bed,
   G. pressuring the gasoline desorbed from said bed to atmospheric or subatmospheric pressure,
   H. passing gasoline desorbed from said bed beneath the surface of a body of stored gasoline, whereby gasoline desorbed from said bed is absorbed in said body of stored gasoline and,
   I. stopping said vacuum pump at a predetermined pressure of about 0.5 psia, or less or after a predetermined time period has elapsed from the time the pump started.

* * * * *

UNITED STATES PATENT OFFICE
CERTIFICATE OF CORRECTION

PATENT NO. : 3,867,111
DATED : February 18, 1975
INVENTOR(S) : William T. Knowles It is certified that error appears in the above-identified patent and that said Letters Patent are hereby corrected as shown below:

Column 8, line 42, before "pressure" cancel "subatmospheric" and insert -- slightly superatmospheric --.

Signed and Sealed this sixteenth Day of March 1976

[SEAL]

Attest:

RUTH C. MASON
*Attesting Officer*

C. MARSHALL DANN
*Commissioner of Patents and Trademarks*